United States Patent [19]
Suzuki

[11] 3,929,896
[45] Dec. 30, 1975

[54] SINGLE STAGE CONVERSION OF SECONDARY HALOCARBONS TO KETONES

[75] Inventor: Shigeto Suzuki, San Francisco, Calif.

[73] Assignee: Chevron Research Company, San Francisco, Calif.

[22] Filed: Nov. 9, 1970

[21] Appl. No.: 88,231

[52] U.S. Cl. .......................... 260/593 R; 260/586 R
[51] Int. Cl.² ..................... C07C 49/06; C07C 49/26
[58] Field of Search .................. 260/593 R, 586 R

[56] References Cited
UNITED STATES PATENTS 2,888,487  5/1959  Asinger et al. ............... 260/593 R
2,903,480  9/1959  Toland ........................... 260/621 R

*Primary Examiner*—D. Horwitz
*Attorney, Agent, or Firm*—G. F. Magdeburger; John Stoner, Jr.; T. G. DeJonghe

[57] ABSTRACT

Ketones are produced by the action of sulfur upon secondary monohalo-substituted hydrocarbons in the presence of water and at an elevated temperature. Nitrogen bases and hydrogen sulfide promote the reaction.

14 Claims, No Drawings

SINGLE STAGE CONVERSION OF SECONDARY HALOCARBONS TO KETONES

BACKGROUND OF THE INVENTION

This invention relates to a process for the production of a ketone, more particularly to the single stage conversion of a halogenated hydrocarbon to a ketone containing the same number of carbon atoms as the halocompound.

Ketones are in general well known and have many uses in the chemical art, particularly as solvents, diluents, and the like.

It is known to prepare a ketone from a secondary alkyl chloride by first hydrolysing the halide to the corresponding alkanol. The alkanol is then oxidized to yield the analogous ketone. Production of ketone from the halide in a single stage would be a desirable improvement in this art.

THE INVENTION

A process for the conversion of a secondary halogenated hydrocarbon to a ketone in a single stage has now been discovered. The halocompound in the liquid phase is contacted with water and sulfur in a mixture which is maintained at a temperature in the range from about 225°C. to 325°C., preferably 260°C. to 320°C., for a period of less than about two hours and at a pressure sufficient to maintain the halocompound in the liquid phase. For each mol of the halocarbon the mixture should contain an amount of water in the range 0.5 to 200 mols and an amount of elemental sulfur or the equivalent of available sulfur in the range 0.15 to 2.0 mols.

The reaction is promoted by the presence of ammonia or a nitrogen compound which is at least as basic as pyridene. It is also promoted by the addition of hydrogen sulfide to the mixture, although hydrogen sulfide is a by-product, as may be seen from the following equation which summarizes a representative reaction:

1. $CH_3CHClCH_3 + S° + H_2O \rightarrow CH_3COCH_3 + HCl + H_2S$.

By equivalent available sulfur, as used herein, is meant all of the sulfur atoms less 1 in a polysulfide anion, for example in the ammonium polysulfide salt $(NH_4)_2 S_5$, four sulfur atoms are available:

2. $(NH_4)_2 S_5 \rightleftharpoons (NH_4)_2 S + 4S°$, and/or sulfur generated in situ by the interaction in aqueous solution of an inorganic sulfide ($H_2S$ or sulfide salt with an inorganic sulfur-oxygen compound containing sulfur in the +6 or or +4 valence state ($H_2SO_4$, $SO_3$, or a sulfate salt; and $SO_2$, or a sulfite salt), for example:

3. $(NH_4)_2SO_4 + 3H_2S \rightarrow 4S° + 2NH_4OH + 2H_2O$
4. $SO_2 + 2H_2S \rightarrow 3S° + 2H_2O$
5. $Na_2SO_3 + 2H_2S \rightarrow 3S° + 2NaOH + H_2O$
6. $H_2SO_4 + 3H_2S \rightarrow 4S° + 4H_2O$ ;

and organic polysulfide sulfur, for example:

7. $2RSH + xS° \rightarrow RS_xR + H_2S$ (R is a hydrocarbon radical, preferably the same as that for the chloride feed; $x$ is 2–10. )

8. $RS_xR \rightarrow (x-1)S° +$ ketone and intermediates + $H_2S$
9. $RS_x(NH_4)$ ($x$ and R as above).

Sulfur and/or one or more sources of available sulfur may be used in the process.

In a preferred embodiment a secondary monochloro n-alkane, for example 2-chlorononane, sulfur, ammonia hydrogen sulfide and water are charged to a pressure reactor fitted for stirring with the mol ratio of the charge, RCl : S : $NH_3$ : $H_2S$ : $H_2O$ being 1 : 0.7 : 1.5 : 0.5 : 20, respectively. After heating the mixture at 300°C. and the autogenous pressure (maximum pressure, 1720 psig) for fifteen minutes, the conversion of the 2-chloroalkane is substantially (>98%) complete. The resulting product mixture contains about 0.3 mols of the alkanone, a trace of the chloroalkane, and 0.6–0.7 mol of intermediate reaction products. The latter, after recovery from the mix, may be added to a fresh charge to the reactor. Thus, in a continuous process which includes recycle of the unconverted feed and intermediates, the yield of the desired ketone is excellent, i.e., may exceed 90 mol percent in the case of ordinary feed compounds.

The production of ketone from a halogenated hydrocarbon by the present invention may be summarized by equation 1) above, but the actual reaction mechanism is believed to be complex and to involve a number of chemical equilibria. A liquid phase reaction mixture appears to be necessary for a useful conversion of the feed. Therefore, a pressure at least sufficient to maintain the feed in the liquid phase is required.

Two of the process variables are especially important with respect to a satisfactory production of ketone. These variables are temperature and the amount of sulfur relative to the halocarbon feed in the reaction mixture.

If the temperature is too high, little or no ketone is produced or recoverable. Temperatures of the order of 330°–340°C. and higher are in general unsatisfactory. On the other hand, useful reaction rates are, in general, experienced when the temperature exceeds about 225°C. Optimum conversions and yields are in general experienced at a process temperature in the range 260°–320°C.

The time at temperature is a factor in the present process. It is mutually related to temperature effects in the usual sense and yet is of a secondary consideration. Satisfactory reaction times are usually periods of less than about two hours, preferably in the range 0.1 to 1 hour.

The stoichiometric requirement for sulfur, see equation (1) above, is one mol per mol of halocarbon feed. Usually satisfactory conversions and yields are experienced where the amount of sulfur in the reaction mixture is in the range of 0.5 to 1.5 mol per mol of halocarbon feed. As much as 2 mols of sulfur per mol of feed may be satisfactory, particularly where the process temperature is in the lower portion of the permissible range.

The amount of water desirably employed varies over a large range. As may be noted by reference to equation (1) above, the oxygen of the ketone function is furnished by the water in the reaction mixture. At least enough water to permit a substantial conversion of the halocarbon feed should be used, e.g., about 0.5 mol of water per mol of feed. An excess of water in the reaction mixture is not detrimental so long as dilution effects do not render the process uneconomical. Broadly an amount of water in the range 0.5 to 200 mols per mol of feed is satisfactory. The preferred relative amount of water, depending upon the other variables for the process, is ordinarily in the range 10–100 mols.

Good conversions of halocarbon feed and yields of ketone are experienced in the present process in the absence of a basic nitrogen compound. However, the presence of a nitrogen compound, for example ammonia, under otherwise comparable conditions improves the ketone yield by as much as a factor of 2–3. Thus, the nitrogen base acts as a promoter for the process. At least in part the mechanism for this enhancement appears to be in the solubilization of the sulfur by formation of polysulfide sulfur, a soluble form. Other nitrogen bases, including pyridine, alkyl amines, morpholine, and the like, are also satisfactory. However, the use of ammonia is in general preferable because of such factors as cost, ease of removal from the product mixture, and the like.

The amount of the nitrogen base present in the reaction mixture is desirably relatively minor compared to the water or halocarbon. In general, for each mol of the feed in the mixture, less than 4 mols of the base should be employed. Best results appear to obtain when the mol ratio of the base per mol of halocarbon is in the range 0.15–0.75 to 1, respectively.

As in the case of the basic nitrogen additives discussed above, good yields and conversions are experienced in the absence of added hydrogen sulfide. The addition of hydrogen sulfide to the process feed often results in a minor but appreciable increase in the ketone yield. Thus, the presence of an amount of hydrogen sulfide in the process feed in the range 0.05–0.75 mol per mol of halocarbon is beneficial.

Inert diluents, such as benzene, alkane mixtures, and alkane-aromatic hydrocarbon mixtures, and the like may be employed in the subject process. Particularly in the case of a high molecular weight feed, the use of a diluent is desirable in order to present the halocarbon in the required liquid phase. For an ordinary halocarbon feed, the use of an inert diluent is, in general, not especially advantageous and usually constitutes an unnecessary process cost.

Halocarbons in which a single hydrogen atom of the parent hydrocarbon is replaced by a halogen atom are satisfactory feeds for use in the instant process provided:

1. that the halogen is attached to a secondary carbon atom;
2. that there is also a hydrogen atom bonded to the halosubstituted carbon atom, i.e., a secondary carbon;
3. that the halosubstituted secondary carbon atom is not included within a six-membered carbocyclic ring; and
4. that the feed is maintained in the liquid phase at a temperature within the process range.

For purposes of convenient reference herein, by the term "ketonizable halocarbon" is meant by definition monohalogenated hydrocarbons which satisfy these four prerequisites. These halocarbons are conveniently represented by the formula $R_nCHX$ in which $n$ is 1 or 2 and if $n$ is 1, R is a divalent hydrocarbon radical and if $n$ is 2, R is a monovalent hydrocarbon radical. When $n$ is 1, as disclosed herein, the carbon atom of the =CHX group cannot be a member of a six-membered carbocyclic ring.

Ketonizable halocarbons are, in general, contemplated for use in the present process. While the halogen substituent may be any halogen atom, as a practical matter for reasons of cost, the halogens should have an atomic number below 54. The chlorides are preferred. As a further practical consideration (in terms of useful ketone products and reasonably available feeds), the carbon atom content of the ketonizable halocarbon feeds for the present process ordinarily will not exceed about 25.

Except for the structural limits inherent in the above-enumerated specific requirements, i.e.:

1. the halocarbon feed must be a secondary halide, and
2. the carbon atom of the =CHX functional group must not be a member of a six-membered carbocyclic ring, the hydrocarbon portion of the ketonizable halocarbon feed, R, may be of any hydrocarbon structure. Preferably the ketonizable halocarbon feed is a single compound or a mixture of compounds of the above formula $R_nCHX$ in which X is chloride and R is a hydrocarbon radical (hydrocarbyl) which is free of non-aromatic carbon-carbon unsaturation, and has a carbon atom content in the range from 4 to 20. More preferable feeds are those in which R is an alkyl group, and of these, most preferable are those in which the carbon skeleton of the R group is free of branching.

Representative halocarbons useful as feeds for the process of my invention are many and varied and some of them are isopropyl chloride, bromide, iodide and fluoride, sec-butyl chloride, 2-chlorohexane, 3-chlorohexane, 4-bromoeicosane, 2-fluorodecane, 3-iodododecane, 5-chloropentacosane, sec-chloropentacontanes, sec-chlorononanes, sec-chlorohexadecanes, and the like secondary chloroalkanes; 3-ethyl-5-chlorohexadecane, 2,2-dimethyl-6-bromopentadecane, 2-chloro-6,7-diethyloctadecane, 3-chloro-5-isopropylhexadecane, and the like branched chain haloalkanes; 2-phenyl-5-chlorotetradecane, 1-cyclohexyl-4-bromononane, 1-(α-naphthyl)-3-chlorododecane, and the like cyclohydrocarbyl substituted haloalkanes; cyclooctyl chloride, cyclododecyl bromide, 1-chloro-4-phenylcyclooctane, 1-chloro-4-methylcyclooctane, and the like substituted and unsubstituted ketonizable cycloalkyl halide feeds; 2-chloro-4-(o-tolyl)-hexadecane, 3-chloro-6-(4-ethylphenyl)-tetradecane, and the like alkylaryl substituted haloalkanes.

The ketonizable halosubstituted hydrocarbons described above may contain an inert substituent group; that is, a single hydrogen atom which is remote from the halogen group may be replaced by a carboxyl ($-CO_2H$) or a carboxamide ($-CONH_2$) group. A remote carbon atom is a carbon atom having at least one intervening carbon atom between it and the carbon atom to which the halogen group is bonded.

The process according to the invention is further illustrated, but not limited, by the following examples:

EXAMPLE 1

Octanone was prepared from 2-chlorooctane in a reaction in which the chloride in the liquid phase was contacted with sulfur and water. Ammonia and hydrogen sulfide were added to the mixture for the promotion of the reaction. Into a 500 ml. autoclave fitted for mixing were charged 2-chlorooctane, water, sulfur, hydrogen sulfide and ammonia in the mol ratio 1:18:0.6:0.38:1.6, respectively. The reactor and charge were maintained at 300°C. for fifteen minutes during which time the maximum pressure in the autoclave was 1720 psi. They were then cooled rapidly and the resulting product was analyzed by conventional methods and found to have the following composition:

|  | Mols/Mol of 2-Chlorooctane Feed |
|---|---|
| Octanone | 0.3 |
| Octene | 0.15 |
| Sec-Octyl Mercaptan | 0.26 |
| 2-Chlorooctane | 0.015 |

Therefore, the conversion of the 2-chlorooctane was 98.5 percent of completion and the in hand yield of octanone, based upon consumed (the octene and octyl mercaptan are reaction intermediates) 2-chlorooctane was 57 mol percent.

EXAMPLE 2

A reaction product obtained as in Example 1 was separated by a fractional distillation in which the octene and ketone was the overhead product. The residue was a mixture of s-octyl mercaptan and s-octyl sulfides. Elemental sulfur, water, ammonia and hydrogen sulfide were added. The resulting mixture had the following composition:

| | |
|---|---|
| Octyl Moiety, mols | 1.0 |
| Available Sulfide Sulfur, mols | 0.9 |
| Hydrogen, Sulfide, mols | 0.5 |
| Ammonia, mols | 0.5 |
| Water, mols | 13. |

As in Example 1, the above-described mixture was charged to a shaking autoclave and heated at 300°C. for 15 minutes. At the end of this period the autoclave and its content were rapidly cooled and the product analyzed. The resulting mixture had the following composition:

| | Mol/Mol Octyl Moiety Feed |
|---|---|
| Octenes | 0.08 |
| Octanone | 0.37 |
| Octyl Mercaptan | 0.25 |

Therefore, the in hand yield based upon consumed octyl moiety was 55 mol percent. Since the analyses demonstrated that no substantial amount of other reaction products or intermediates had been produced, the difference in the above examples between theoretical and actual yields mainly represents mechanical losses.

Except for the case where the secondary carbon bearing the halogen is an element of a six-membered carbocyclic ring, secondary halosubstituted hydrocarbon feeds, single compounds or mixtures, are readily converted in the present process to ketones containing the same number of carbon atoms. The above examples demonstrate that good yields and conversions are obtained in a single stage and that in a continuous process in which the intermediate products, olefins, thiols and organic sulfides, are recycled, excellent yields are experienced in the process of the invention.

I claim:

1. The process for the production of a ketone by the reaction of sulfur and water with a halocarbon feed which comprises contacting the feed in the liquid phase with water and sulfur at a temperature in the range from about 225°C. to 325°C. for a period of less than about two hours, wherein for each mol of the feed there is present from about 0.5 to 200 mols water and from about 0.15 to 2 mols sulfur, said feed comprising at least one compound of the formula $R_2CHX$, wherein R is an alkyl or cycloalkyl group; and wherein X is a halogen having an atomic number below 54; said compound having a carbon atom content of one to 25.

2. The process as in claim 1 wherein said temperature range is from about 260°C. to 320°C., said reaction period is in the range from about 0.1 - 1 hour, and the amount of water is in the range 10–100 mols, and of sulfur is in the range 0.5 - 1.5 mols; wherein X is chloride, and wherein the carbon atom content of the feed is in the range 4 to 20 and said R is free of non-aromatic carbon-carbon unsaturation.

3. The process as in claim 2 wherein $n$ is 2 and said R groups are alkyl groups.

4. The process as in claim 3 wherein said R groups are free of branching.

5. The process as in claim 1 wherein said reaction is promoted by at least one compound of the group ammonia and hydrogen sulfide.

6. The process as in claim 5 wherein the amount of ammonia per mol of feed is in the range 0.15 to 0.75.

7. The process as in claim 5 wherein the amount of hydrogen sulfide per mol of feed is in the range 0.05 to 0.75.

8. The process for the production of nonanone which comprises contacting 2-chlorononane with sulfur, ammonia, hydrogen sulfide and water in a mol ratio of about 1:0.7:1.5:0.5:20, respectively, at a temperature of about 300°C. for a period of about fifteen minutes, said contacting being at a pressure sufficient to maintain 2-chlorononane in the liquid phase.

9. The process for the production of a ketone by the reaction of sulfur and water with a chlorocarbon feed which comprises contacting the feed in the liquid phase with water and sulfur at a temperature in the range from about 225°C. to 325°C. for a period of less than about two hours, wherein for each mol of the feed there is present from about 0.5 to 200 mols water and from about 0.15 to 2 mols sulfur, said feed comprising at least one compound of the formula $R_2CHCl$, wherein R is an alkyl or cycloalkyl group having a carbon atom content of one to 25, and said reaction being promoted by at least one compound of the group ammonia and hydrogen sulfide.

10. The process as in claim 9 wherein said temperature range is from about 260°C. to 320°C., said reaction period is in the range from about 0.1- 1 hour, and the amount of water is in the range 10–100 mols, and of sulfur is in the range 0.5 - 1.5 mols; and wherein the carbon atom content of the feed is in the range 4 to 20 and said R is free of non-aromatic carbon-carbon unsaturation.

11. The process as in claim 9 wherein said R groups are alkyl.

12. The process as in claim 11 wherein said R groups are free of branching.

13. The process as in claim 9 wherein the amount of ammonia per mol of feed is in the range 0.15 to 0.75.

14. The process as in claim 9 wherein the amount of hydrogen sulfide per mol of feed is in the range 0.05 to 0.75.

* * * * *